United States Patent [19]

Gaon

[11] 3,898,386

[45] Aug. 5, 1975

[54] ERROR DETECTION AND PROTECTION CIRCUITS FOR DUPLICATED PERIPHERAL UNITS

[75] Inventor: David E. Gaon, Villa Park, Ill.

[73] Assignee: GTE Automatic Electric Laboratories Incorporated, Northlake, Ill.

[22] Filed: Jan. 18, 1974

[21] Appl. No.: 434,750

[52] U.S. Cl. ....... 179/8 R; 179/18 FF; 179/175.2 R

[51] Int. Cl.[2] .......................................... H04M 3/22

[58] Field of Search .......... 179/175.2 C, 175.2 R, 175.23, 179/7 MM, 7 R, 7.1 R, 8 R, 18 FF, 18 FG

[56] References Cited

UNITED STATES PATENTS

| | | | |
|---|---|---|---|
| 3,312,947 | 4/1967 | Raspanti | 340/172.5 |
| 3,409,877 | 11/1968 | Alterman et al. | 340/172.5 |
| 3,492,446 | 1/1970 | Lapsevskis et al. | 179/175.2 R |
| 3,509,532 | 4/1970 | Vande Wege | 340/146.1 |
| 3,578,916 | 5/1971 | Lucas et al. | 179/18 GE |
| 3,794,973 | 2/1974 | Huber et al. | 340/146.1 BE |
| 3,825,689 | 7/1974 | Baichtal et al. | 179/7 R |

*Primary Examiner*—Thomas W. Brown

[57] ABSTRACT

An addressable ticketing scanner apparatus for use in a communication switching system includes duplicated scanner units, one normally operable in an active mode and the other in a standby mode, for selectively interrogating scan points arranged in a common matrix. Error detection apparatus associated with matrix access circuits of the duplicated scanner units, including a plurality of current sources and a plurality of current sinks, are operable to provide an error indication whenever more than one current source or current sink is enabled during a given scan operation. Power switch circuits are responsive to a command provided by the common control to deenergize the matrix access circuits of the standby scanner unit.

9 Claims, 12 Drawing Figures

PA BASIC ROUTINE SCAN

ERROR DETECTION AND PROTECTION CIRCUITS FOR DUPLICATED PERIPHERAL UNITS

CROSS-REFERENCES TO RELATED APPLICATIONS AND PATENTS

The preferred embodiment of the invention is incorporated in a COMMUNICATION SWITCHING SYSTEM WITH MARKER, REGISTER AND OTHER SUBSYSTEMS COORDINATED BY A STORED PROGRAM CENTRAL PROCESSOR, U.S. patent application Ser. No. 342,323, filed Mar. 19, 1973 issued on Sept. 10, 1974, as U.S. Pat. No. 3,835,260, hereinafter referred to as the SYSTEM application. The system may also be referred to as No. 1 EAX or simply EAX.

The memory access, and the priority and interrupt circuits for the register-sender subsystem are covered by U.S. Pat. No. 3,729,715 issued Apr. 24, 1973 by C. K. Buedel for a MEMORY ACCESS APPARATUS PROVIDING CYCLIC SEQUENTIAL ACCESS BY A REGISTER SUBSYSTEM AND RANDOM ACCESS BY A MAIN PROCESSOR IN A COMMUNICATION SWITCHING SYSTEM, hereinafter referred to as the REGISTER-SENDER MEMORY CONTROL patent. The register-sender subsystem is described in U.S. Pat. No. 3,737,873 issued June 5, 1973 by S. E. Puccini for DATA PROCESSOR WITH CYCLIC SEQUENTIAL ACCESS TO MULTIPLEXED LOGIC AND MEMORY, hereinafter referred to a the REGISTER-SENDER patent.

The marker for the system is disclosed in the U.S. Pat. No. 3,681,537, issued Aug. 1, 1972 by J.. W. Eddy, H. G. Fitch, W. F. Mui and A. M. Valente for a MARKER FOR COMMUNICATION SWITCHING SYSTEM.

The communication register and the marker transceivers are described in U.S. patent application Ser. No. 320,412 filed Jan. 2, 1973 issued on June 4, 1974, as U.S. Pat. No. 3,814,859 by J. J. Vrba and C. K. Buedel for a COMMUNICATION SWITCHING SYSTEM TRANSCEIVER ARRANGEMENT FOR SERIAL TRANSMISSION, hereinafter referred to as the COMMUNICATIONS REGISTER patent application.

The executive or operating system of the stored program processor is disclosed in U.S. patent application Ser. No. 347,281 filed Apr. 2, 1973 by C. A. Kalat, E. F. Wodka, A. W. Clay, and P. R. Harrington for STORED PROGRAM CONTROL IN A COMMUNICATION SWITCHING SYSTEM, hereinafter referred to as the EXECUTIVE patent application.

The computer line processor is disclosed in U.S. patent application Ser. No. 347,966 filed Apr. 4, 1973 issued on Aug. 20, 1974, as U.S. Pat. No. 3,831,151 by L. V. Jones and P. A. Zelinski for a SENSE LINE PROCESSOR WITH PRIORITY INTERRUPT ARRANGEMENT FOR DATA PROCESSING SYSTEMS.

The ticketing trunk supervision for the local automatic message accounting subsystem is disclosed in patent application Ser. No. 432,803, filed Jan. 14, 1974, now abandoned by L. Lattanzi, G. Grzybowski and P. R. Harrington.

The scanner for the local automatic message accounting subsystem is disclosed in patent application Ser. No. 434,743, filed Jan. 18, 1974 by B. F. Gearing, M. R. Winandy, G. Grzybowski and D. F. Gaon, hereinafter referred to as the SCANNING APPLICATION, and in two articles in the GTE Automatic Electrical Technical Journal, Vol. 13, No. 4, (Oct., 1972) at pages 177–184 and pages 185–196.

The above patents, patent applications, and articles are incorporated herein and made a part hereof as though fully set forth.

BACKGROUND OF THE INVENTION

1. Field of the Invention

This invention relates to common control communication switching systems, and more particularly, to error detection and protection circuits for a peripheral unit controlled by the common control apparatus.

2. Description of the Prior Art

In the U.S. Pat. No. 3,775,573 of D. E. Gaon, entitled "Contact Status Sensing Arrangement," which issued Nov. 27, 1973, there is disclosed a contact closure sensing arrangement for use in an electronic toll ticketing scanner to permit monitoring of the status of a plurality of contacts arranged in a matrix array.

The arrangement employs matrix access circuits which include current source drivers and current sink drivers connected between columns and rows, respectively of the matrix to permit interrogation of the status of contacts. In addition, cable source drivers and cable sink drivers are employed to minimize the effect of cable capacitance on current paths established through the matrix by selective enabling of current source and current sink drivers.

Scanning of groups of contacts is effected under the control of common control apparatus which supplies data for selectively enabling current source and current sink drivers, and the cable source and sink drivers associated with the set of contacts being interrogated in a predetermined sequence as is described in the referenced patent.

For the correct detection of the status of the contacts in the matrix, it is essential that there be correct sequencing and timing of the enabling and disabling of the current source and sink drivers and assurance that only one current sink is energized for a given scan operation. If none, or more than one current sink is enabled at a given time, an erroneous output data may be provided.

Accordingly, it would be desirable to have a reliable method and apparatus for monitoring the operation of the current sources and current sinks and for providing an error indication in the event of improper operation of the matrix access circuits.

Moreover, in a facility where duplicate scanner units are employed for reliability purposes to control a common contact matrix, one being normally configured active and the other standby, there arises a problem when a fault in one scanner renders the other scanner ineffective in achieving correct data from the matrix. For example, if one of the scanner units has been placed in standby mode due to a malfunction, and if the source of the malfunction is in the matrix access circuits, where a given current source fails in the permanently on mode, the condition could arise where there is always a current available for a given column of the matrix. Thus, when a current source of the active scanner unit is enabled, two paths may be established over two different sections of the matrix resulting in an erroneous output. Accordingly, it would be desirable to be able to deenergize matrix access circuits of a standby scanner unit to prevent interference of the standby scanner unit with the operation of the active scanner unit.

SUMMARY OF THE INVENTION

It is therefore an object of the present invention to provide a method and apparatus for determining proper functioning of matrix access circuitry in an electronic scanner unit.

It is a further object of the present invention to provide a method and aparatus for deenergizing matrix access circuits of a standby scanner unit of a duplicated pair to prevent the standby scanner unit from interfering with the operation of the active scanner unit.

In an exemplary embodiment, the method and apparatus of the present invention are incorporated in a communication switching system which employs a common control means for controlling the operation of duplicated scanner units which in turn enable selective interrogation of contacts of a contact matrix array.

Each of the duplicated scanners includes matrix accessing means having a group of first current source means and a group of first current sink means which are selectively enabled in pairs to permit interrogation of a given group of contacts of the matrix. In addition, a group of second current source means and a group of second current sink means are employed to minimize capacitance effects. The first and second current source means and first and second current sink means are enabled in a predetermined sequence under the control of control signals provided by timing means of the scanner unit in response to commands provided by the common control means.

Moreover, one out of N circuits associated with each of the first and second current source means and first and second current sink means are operable to monitor the operation of the first and second current source means and first and second current sink means and to provide an error output when fewer or more than one current source or sink means of a given group is enabled at the same time.

In accordance with the invention, the first current sink means supplies an input to the one out of N circuit means associated with the second current sink means, and the second current sink means supplies an input to the one out of N circuits associated with the first current sink means. Accordingly, the one out of N circuit means associated with the first and second current sink means preclude an error indication during normal operation. On the other hand, the one out of N circuit means are operable to provide an error output in the event that fewer or more than one current sink means of a given group is enabled at the time the outputs of the one out of N circuit means are monitored.

In accordance with a further aspect of the invention, each of the duplicated scanner units include power switch means operable when enabled to extend power to the current source and current sink means of associated matrix access circuits. The power switch means of the active scanner unit is enabled by a control signal provided by the timing means to supply power to the matrix access circuits. On the other hand, the power switch means of the standby scanner unit are disabled by a control signal provided by the timing means of the standby scanner unit to deenergize the matrix access circuits. The power switch means of each of the duplicated scanner units are selectively enabled in accordance with configuration instructions provided by the common control means.

DESCRIPTION OF THE DRAWINGS

The above-mentioned and other objects and features of this invention and the manner of attaining them will become apparent, and the invention itself will be best understood by reference to the following description of a preferred embodiment.

DESCRIPTION OF A PREFERRED EMBODIMENT

General Description

Figure 1:
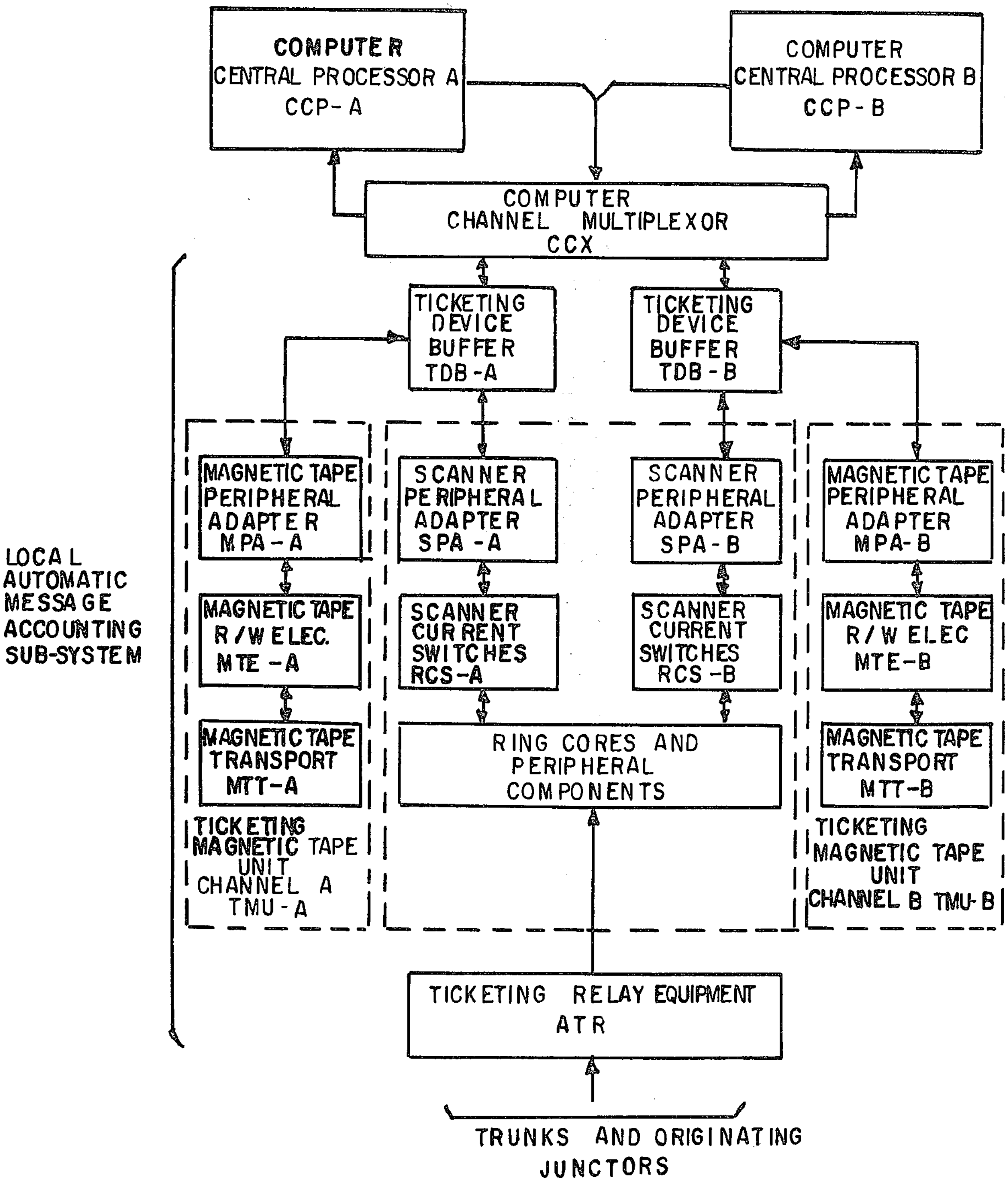
FIG. 1 is a block diagram of the ticketing system including the ticketing scanner unit employed by the present invention.

Referring to FIG. 1, there is shown a block diagram of a local automatic message accounting LAMA ticketing subsystem 145.

As more fully described in the SCANNER APPLICATION referenced above, the ticketing subsystem 145 comprises a ticketing scanner unit TSU which monitors the status of trunks and originating junctors over ticketing relay frame ATRF to provide data for use in customer billing, toll separation, traffic engineering studies, planning and evaluation of toll services, and maintenance of toll facilities. The system 145 also includes ticketing magnetic tape units TMU which serve as a recording medium for data provided by the scanner unit TSU. The ticketing scanner unit TSU and the ticketing magnetic tape unit TMU are controlled by common control apparatus of the system and communicate with a computer central processor CCP of the system via a communication channel multiplex CCX and ticketing device buffer TDB. The LAMA system 145 makes maximum use of the computer central processor CCP of the common control apparatus as well as relevant information accumulated or generated by other subsystems of the communication switching system in performing the ticketing operations.

Hardware Configuration and Functional Description

The toll ticketing equipment is a hybrid subsystem consisting of hardware physical equipment and software programs. FIG. 1 shows the major hardware units associated with the toll ticketing subsystem 145. The toll ticketing subsystem consists of two basic equipment units called the automatic toll ticketing frame ATTF and the automatic toll ticketing relay frame ATRF. A subsystem configuration consists of one ATTF and either one or two ATRF's.

Automatic Toll Ticketing Relay Frame ATRF

The ATRF is a single-frame unit containing the scan point devices monitored by the ticketing scanner. A scan point device may consist of a 1A correed. The coil of the correed is wired to the incoming trunk or originating junctor being monitored. The contact of the correed is monitored by the scanner. Each ticketed outgoing trunk requires two scan points. All DDD calls are ticketed on outgoing trunks. Each metered originating junctor or incoming trunk requires one scan point. All MRS calls are metered on originating junctors and incoming trunks.

Automatic Toll Ticketing Frame ATTF

The automatic toll ticketing frame ATTF is a dual frame unit containing two magnetic tape units TMU-A, TMU-B and a dual channel ticketing scanner unit TSU which communicate with the computer central processor CCP via a pair of ticketing device buffers TDB-A, TDB-B and the computer channel multiplexer CCX. The magnetic tape units TMU include a magnetic tape transport MTT, associated read/write circuits MTE and a peripheral adapter MPA. The ticketing scanner unit TSU includes a ring core matrix COR and associated peripheral components, duplicated scanner current switches RCS and peripheral adapter SPA.

The ticketing magnetic tape unit TMU and ticketing scanner unit TSU connect to the central processor CCP via the computer channel multiplex CCX. Two channels A and B are provided for reliability, each channel consisting of a scanner unit TSU and a magnetic tape unit MTU which share a common interface to the channel multiplex CCX in the form of the ticketing device buffers TDB. Ticketing device buffer TDB-A is dedicated to tape magnetic unit TMU-A and ticketing scanner unit TSU-A and comprise channel A. Ticketing device buffer TDB is dedicated to ticketing magmetic units TMU-B and ticketing scanner unit TSU-B and forms channel B.

At any point in time, only one of the units TMU or TSU of a given channel is active. The unit TMU, TSU of the other channel is in a standby mode.

More specifically, in normal operation, both buffers TDB-A and TDB-B are active. One channel is dedicated to the corresponding ticketing scanner unit such as unit TSU-A with the associated ticketing magnetic tape unit TMU-A in standby while the other channel is dedicated to its associated ticketing magnetic unit TMU-B while the associated ticketing scanner unit TSU-B is in standby. If a fault is detected in the active channel, the system reconfigures under program control to the standby channel.

If a fault should occur in one of the channels, the entire ticketing operation can be handled by the other channel, freeing the faulty channel for maintenance. Hardware errors are detected during operation by means of parity and one-out-of-N checking circuits. In the event of an error, a particular task is repeated to account for the possibility of transients. If an error occurs during the second attempt, the system reconfigures to single-channel operation and places the faulty unit out of service.

Ticketing Scanner Unit TSU

The ticketing scanner unit TSU is a medium speed electronic scanner/multiplex device. Its function is to monitor the scan point switches located in the frame ATRF, the purpose of which is to duplicate the call processing state of the trunks and originating junctors. The unit TSU functions under address control by the computer central processor CCP. Each scan address retrieves the status of 24 scan points.

Ticketing Magnetic Tape Unit TMU

The ticketing magnetic tape unit consists of the magnetic tape transport and its associated read/write electronics, data buffering, error detection, and tape drive control electronics.

Ticketing Device Buffer TDB

The ticketing device buffer provides the I/O interface to the computer complex. All subsystem interrupts and all data and instructions are routed via the buffer TDB, there being only one error interrupt and one ready interrupt associated with the buffer TDB. The buffer TDB data channel consists of twenty-four bits plus parity, the parity being checked or generated according to direction of transmission. One of N checking is performed on select instructions and certain interface leads of the peripheral adapter. There is a full word of status bits accessible by a select instruction. The buffer TDB is equipped in duplicate, each unit serving one scanner and one magnetic tape channel. In normal active operation, one buffer TDB is used to service the I/O operation to the scanner and the other buffer TDB services the magnetic tape unit. The role is switched on alternate days. Under a fault condition, one buffer TDB could service both a scanner and magnetic tape unit sequentially, with the magnetic tape unit having the highest priority.

DETAILED DESCRIPTION

Figure 2:
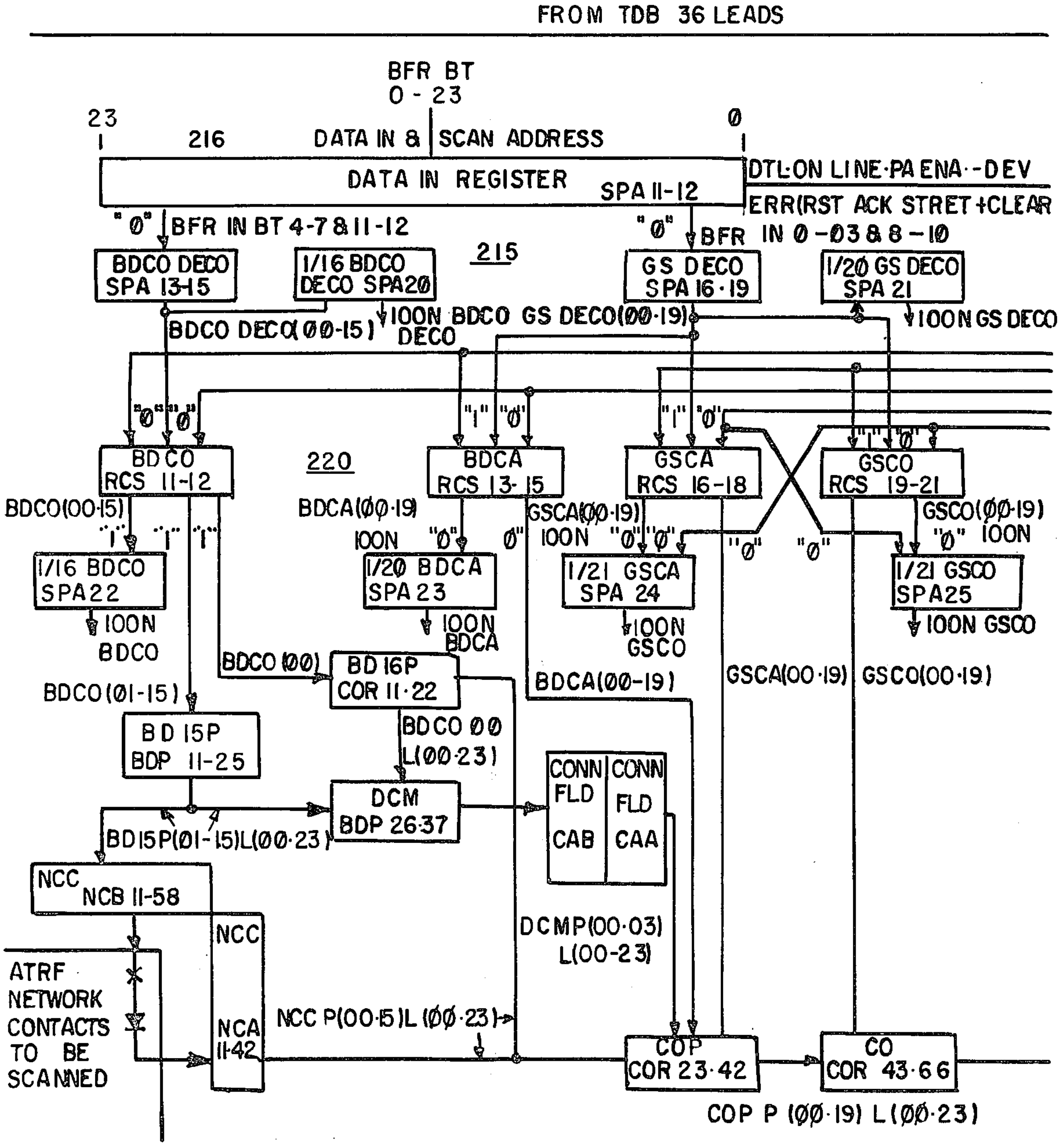
FIGS. 2 and 2A when arranged in a side by side relationship show a detailed block diagram of the scanner peripheral adapter of the scanner unit shown in FIG. 1.
Figure 2A:
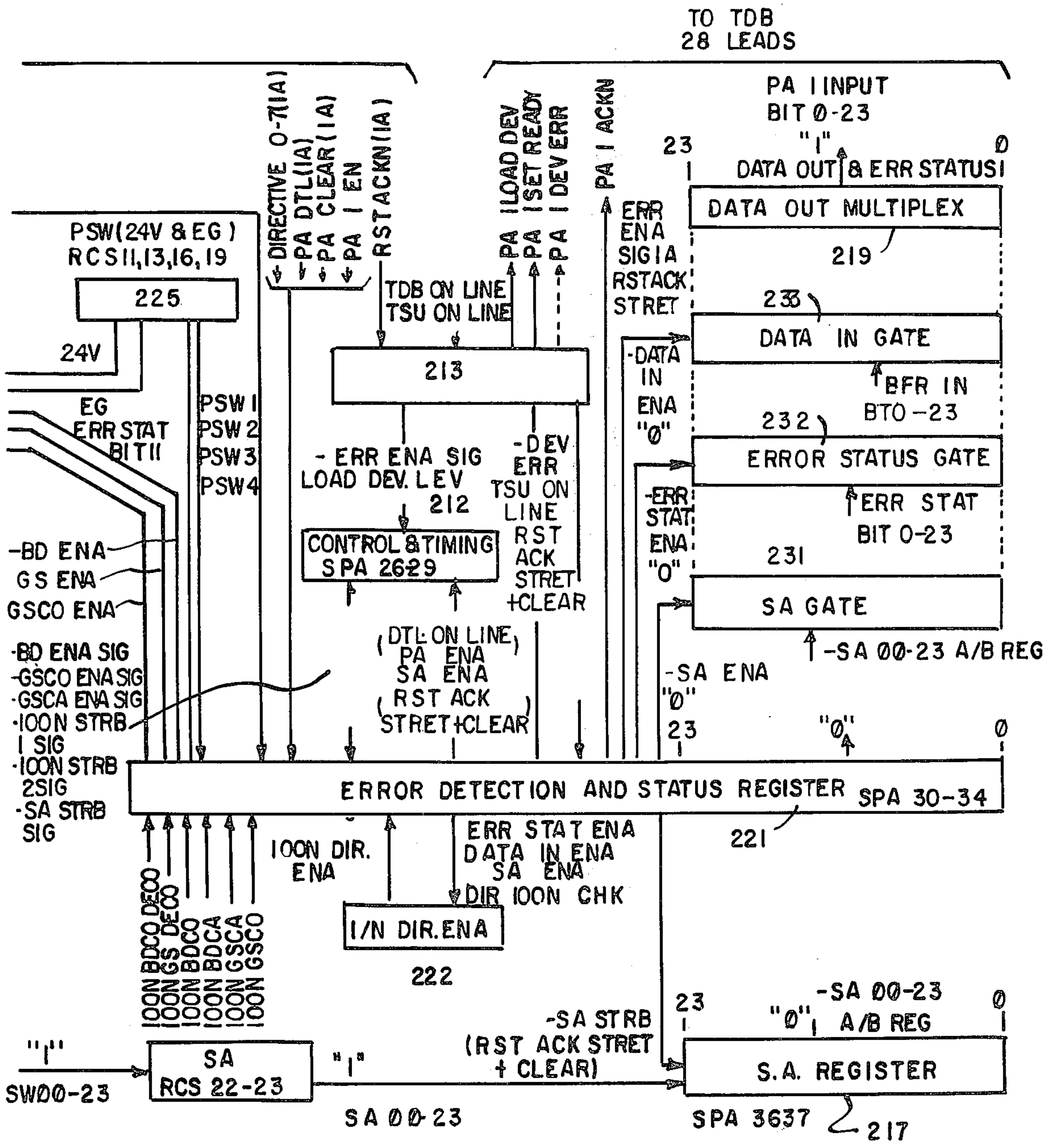

Referring to FIGS. 2 and 2A, there is shown a block diagram of the electronic control and switching circuits which comprise the scanner peripheral adapter SPA and the ring core scanner RCS, and passive components, including battery driver peripherals BDP15, BDP16 core peripheral COP, and network interface NCC which serve as the interface between the electronic circuitry of the frame ATTF and the electromechanical circuitry of the frame ATRF.

Scanner Peripheral Adapter

For the purposes of the ticketing scanner unit TSU and in normal operation thereof, one ticketing device buffer TDB serves the scanner peripheral adapter SPA, and at the same time, the other ticketing device buffer TDB serves the magnetic tape peripheral adapter MPA.

The buffer TDB interfaces directly with the scanner peripheral adapter SPA via leads designated in FIGS. 2 and 2A as follows:

24 Data In leads marked BFR BTO to BFR BT23
24 Data Out leads marked PA 1 INPUT BIT 0 to PA 1 INPUT BIT 23
8 Directive leads marked DIRECTIVE 0 (1A) to DIRECTIVE 7 (1A)
7 Control leads marked PA DTL (1A)
PA CLEAR (1A)
PA 1 EN
RST ACKN (1A)
PA 1 LOAD DEV
PA 1 SET READY PA 1 ACKN
1 Dummy CONTROL LEAD PA 1 DEVICE ERR As indicated above, the ticketing device buffer TDB basically serves as an interface between the ticketing scanner unit TSU and the magnetic tape unit TMU and serves to extend data or control signals provided by the central processor to either the magnetic tape unit MTU or the scanner unit TSU in accordance with directives supplied by the central processor unit CPU. In addition, the ticketing device buffer TDB serves to return responses including data and controls provided by the ticketing scanner unit TMU and the magnetic tape unit TMU to the central processor unit CPU.

The purpose of the scanner peripheral adapter SPA is to interpret instructions received from the ticketing device buffer TDB into a specific set of sequences required to perform the function indicated by control or directive signals provided by the central processing unit CPU. The scanner peripheral adapter SPA is basically comprised of SUHL logic circuits which receive and decode the instructions and data extended to the scanner peripheral adapter SPA via the ticketing device buffer TDB from the central processing unit CPU.

The data word or address received is translated into enable signals by which the status of specific groups of up to 24 network contacts are interrogated during a given scan cycle. The scanner adapter SPA includes timing and control circuits 212, 213 and decoding circuits, indicated generally at 215, which control the sequential operation of the scanner unit TSU. The scanning adapter SPA also includes data registers, 216–218, which store the address data received, the scan data and the error status respectively, and a data output multiplexer 219 which enables different sets of data to be transmitted back to the central processing unit CPU via the device buffer TDB. Also 1/N check circuits 220 of the scanner adapter SPA, associated with the matrix access circuits of the ring core scanner RCS, insure that only one group of contacts of the scan matrix are interrogated at a time, since simultaneous reading of two or more groups could cause erroneous billing to customers. A power switch circuit 525 in each of the scanner adapters SPA-A, SPA-B, enables power to be supplied to the matrix access circuits of the on-line scanner unit TSU.

The scanner adapter SPA checks for correct timing and validity of received instructions and all errors are registered during the operation of the scanner adapter SPA and the circuitry of the scanner adapter SPA is cleared at the end of each operation under the control of signals provided by the device buffer TDB.

The scanner adapter SPA interfaces with:
the buffer TDB, as described above;
the ring core scanner RCS, via 144 leads including:
16 leads marked
BDCO DECO 00 to BDCO DECO 15
20 leads marked
GS DECO 00 to GS DECO 19
76 leads marked
BDCO 00 100 N to BDCO 15 100N
BDCA 00 100 N to BDCA 100n N
GSCA 00 100N to GSCA 19 100N
GSCO 00 100N to GSCO 19 100N
3 leads marked
-BD ENA, GSCA ENA and GSCO ENA
24 leads marked
SA00 to SA23
5 leads marked
-ERR STAT BT11 (ON LINE)
and PSW1 to PSW4

Ring Core Scanner RCS

Referring to FIG. 2, the ring core scanner RCS comprises the access circuits for the scanning matrix COR and includes high current switching circuits which are used for driving current over long cable distances to the duplicated network status contacts and through sensing cores CO of the scanning matrix. The ring core scanner RCS includes core battery driver circuit BDCO, cable battery driver circuit BDCA, cable ground switching circuits GSCA, and core ground switching circuits GSCO. As is more fully described in the SCANNING APPLICATION referenced above, the repeating relay contacts C are arranged in a 15 by 24 by 16 matrix in such a manner that each core battery driver BDCO serves a matrix of 24 by 16 network contacts, made up of 24 legs with each leg a multiple of up to 15 contacts C. For scanning purposes, 15 core battery driver circuits BDCO-BDC15 are provided. Also, 15 cable battery drivers BDCA1-BDCA-15, and 16 cable ground drivers GSCA0-GSCA15 are provided.

The access circuits also include 16 core ground switch circuits GSCO0-GSCO15 The core battery drivers BDCO and the core ground switches GSCO are selectively operable in pairs to provide current paths over the matrix through the network contacts and associated sensing cores.

The core ends of all the cables between the frame ATRF and the frame ATTF are kept positively charged through the use of cable battery driver circuits BDCA and the current source ends of the cables are negatively charged by using discharge resistors at the battery drive core circuits BDCO to minimize the effect of distributed cable capacitance.

Battery Driver Peripherals, BDP

These circuits include driver peripheral circuits BD15P and diode matrix check circuits DCM. There are 15 peripheral circuits BD15P each associated with one of the core drivers BDCO 01 to BDCO 15 and comprises 24 resistors, each of which represents a BCDO leg serving a multiple of up to 16 network contacts C on the current source side of the scan path. Each contact forms part of a leg in a plane of a driver GSCO group of circuits. These resistors limit the driving current into the ring cores CO and properly terminate the lines connecting the unit TSU to the Automatic Ticketing Repeating Relays Frames ATRF.

The diode matrix diode DCM, in conjunction with four addition core ground switch drivers GSCO 16–19 form part of the checking facility for the unit TSU.

There are 24 matrix diode circuits DCM. Each check circuit DCM consists of a group of diodes arranged in a four bit diode check matrix. Each of the four bits represent a leg in one of GSCO 16 to GSCO 19. The inputs of these circuits are extended from the BD15P and BD16P (BDCO 00 legs). The four outputs are served by drivers GSCO 16 to GSCO 19. Two types of checks are achieved by these circuits.

a. Circuits associated with battery drivers BDCO are checked for correct operation. Here the diodes are considered as pseudo-closed network contacts. Therefore, by switching a driver BDCO and the appropriate driver GSCO group a scan data read-out of 1111 . . . 11 will be obtained from the sense elements.

b. In conjunction with driver BDCO 00 and its associated circuitry, checks are performed to insure there are no short circuited contact diodes and therefore eliminates sneak paths.

Core Peripheral Circuits COP

There are 20 core peripheral circuits COP each individually associated with a driver GSCO group. Each peripheral circuit COP consists of 24 groups of discrete components each group forming a GSCO leg serving a multiple of up to fifteen network contacts.

Each group of discrete components contains a resistor to limit sense current and to properly terminate the return cable from the network contact. Also further resistors limit line charge current for BDCA circuits. There are diodes associated with GSCA and zener diodes associated with the GSCO circuits.

Core Circuits CO

These cores are the sensing elements of the subsystem TSU. There are 24 core circuits CO. All of these consists of ferrite toroids operating as a current pulse transformer with a 1:23 ratio.

The circuits derive their inputs from the core peripheral circuits COP and their outputs are served by the driver circuits GSCO.

Battery Drive Peripheral Circuits BD16P

These circuits form part of the unit TSU checking facility. They consist of a battery core driver BDCO 00 feeding a multiple of 24 resistors for current limiting and each resistor serving a multiple of 16 diodes representing pseudo-closed network contacts. Each diode is then connected to its corresponding leg and plane of peripheral circuit COP.

Referring to FIGS. 2 and 2A, in a normal scan operation, scanner TSU receives an instruction, which is a command to perform scan of a group of contacts, and simultaneously receives the address of the scan. The address is received by and stored in data in register 216 which is comprised of a plurality of latch circuits, 24 in the exemplary embodiment. The directive or command is extended directly to the error status register 221 over separate data lines.

At the reception of the command, the control and timing circuit 212 is enabled to initiate the generation of timing pulses which then, until the end of the scan cycle, control the sequencing of the operation of the scanner unit TSU. The timing signals generated include —BD ENA SIG, which is used to enable the battery driver circuits BDCO and BDCA; GSCO ENA SIG, which is used to enable the core sink driver circuits GSCO; and GSCA ENA SIG, which is used to enable the cable sink driver circuit GSCA. The timing circuit 212 also generates signals 100N STRB 1 SIG, and 100N STRB 2, which are used to strobe the outputs of the 1 out of N check circuit 220, and a signal —SA STRB SIG which is used to strobe the outputs of the sense amplifier SA into the sense amplifier register 217.

The address data stored in the data In register 216 is extended to the source decoder circuits BDCO DECO and the sink decoder circuits GS DECO, which responsively provide signals for enabling the particular battery driver circuits BDCO, BDCA and ground driver circuits GSCO, GSCA designated by such address. The output of the source decoder BDCO DECO is extended to an input of the core battery driver BDCO. A second input of the battery driver circuits BDCO is connected to the output of the power switch circuits 525 which supply 24 volts to the core driver circuits BDCO when the power switch circuit 25 is enabled. A third input of the core driver circuit BDCO is connected to the output of the error status register 221 to receive the enabling signal —BD ENA SIG.

The cable source driver BDCA has an input connected to the output of the ground switch decoder GS DECO and a second input connected to the output of the power switch circuit 225. A third input to driver circuit BDCA is connected to an output of the status register 221 to receive the signal —BD ENA provided by the timing circuit 212.

Cable ground driver GSCA has a first input connected to the output of decoder GS DECO, a second input connected to output EG of the power switch 225 and a third input connected to an output status register 221 to receive the signal —GSCA ENA SIG provided by the timing circuit 212. Core ground driver circuit GSCO has a first input connected to the output of the decoder GS DECO, a second input connected to the output EG of the power switch circuit 225 and a third input connected to an output of status register 221 to receive the signal GSCO ENA SIG.

The outputs of the current driver BDCO are extended to the contact matrix over battery driver peripherals BD15P and BD16P. The output of the core ground switch circuit GSCO is extended to the matrix over core periphery circuits COR. The outputs of the cable current and cable ground driver circuits BDCA, GSCA are extended to the matrix over core peripherals COP.

The outputs of the cable and core battery drivers BDCA, BDCO and the cable and core sink drivers GSCA, GSCO are also extended to associated 1 out of N circuits 1/20 BDCO, 1/16 BDCO, 1/21 GSCA and 1/21 GSCO, respectively. The 1 out of N circuits 220 are provided to monitor the operation of the current drivers BDCO, BDCA and the sink drivers GSCO, GSCA and the timing of the enabling signals provided by the timing circuit 212. The correct timing and sequencing of the switch on-switch off operation of the ground drivers GSCO and GSCA as well as the enabling of only one of the cable ground drivers GSCA and one of the core ground drivers GSCO of a given group is indicated by the 1 out of N check circuits.

Figure 3:
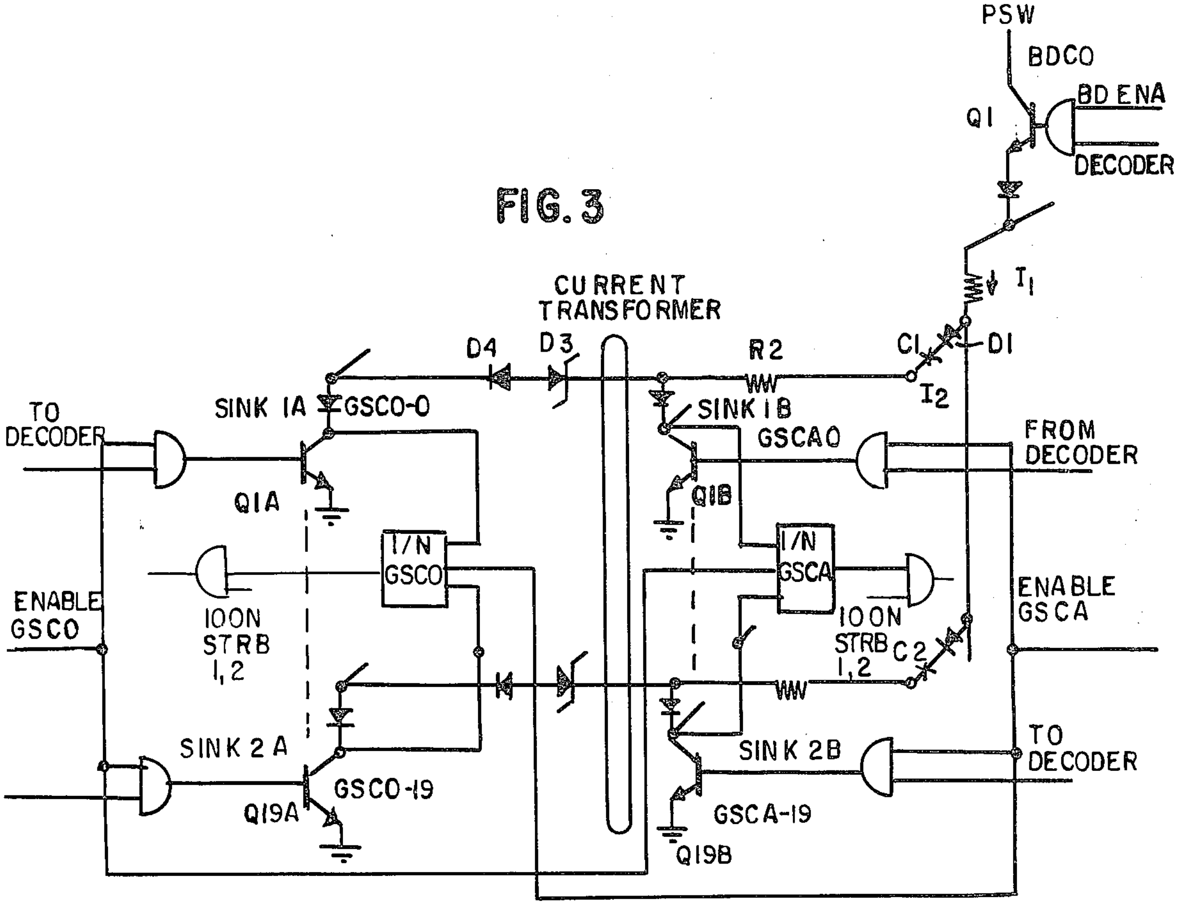
FIG. 3 is a simplified schematic circuit diagram of the matrix access circuits for the scanner unit.

Referring to FIG. 3, there is shown a simplified circuit diagram of the matrix access circuitry shown in FIG. 2. The core ground drivers GSCO, such as drivers GSCO-0 and GSCO-19 comprise transistors Q1A and Q19A, respectively. The cable ground driver GSCA, such as drivers GSCA-0 and GSCA-19 comprise transistors Q1B and B19B, respectively. The core current driver BDCO comprises a transistor Q1.

Also in FIG. 3, there is shown outputs of each ground switch driver GSCO connected to inputs of the 1 out of N check circuits for the driver circuit GSCO and likewise, for the 1 out of N check circuit GSCA.

To interrogate the status of contact C1, for example, current source BDCO and current sink GSCO are enabled to provide a sense path through the core CO over contact C1. To interrogate the status of contact C2, current source BDCO and current sink GDCO19 are enabled to provide a sense path through the core CO which includes contact C2.

Normally, current driver BDCA is enabled to connect power to the sense line which connects contact C1 into the matrix. Also, current driver BDCO and ground drivers GDCO and GSCA are disabled. During normal scan operation, the signal BD ENA causes battery driver BDCA to be disabled and battery driver BDCO and cable driver GSCA to be enabled to permit discharge of the line which connects contact C1 to the matrix. At a later timing pulse, GSCO ENA, the required current sink GSCO-0 is turned on. Thereafter, when timing pulse GSCA ENA is provided, the ground switch GSCA-0 is disabled such that a scan path including the contact C1 is established through the core CO permitting current flow from the current driver BDCO to the sink driver GSCO-0. When the network contact C1, which is connected in such path, is closed, a pulse is induced in the sense winding of the associated core CO. Such pulse is extended to associated sense amplifier SA and thence to the sense amplifier register 217 (FIG. 2). The sense amplifier register 217 comprises twenty-four latch circuits, and at the end of a scan, the sense amplifier register 217 stores the status of the 24 contacts for the given leg of the sense matrix which has been addressed. The data pulses provided by the sense amplifier SA are gated into the sense amplifier register 217 in response to a further timing pulse SA STRB SIG provided by the timing circuit 212.

Referring to FIG. 3, if sink GSCO 19 is permanently on, then upon interrogation of contacts C1 by enabling driver BDCO and sink GSCO-0 the current I1 supplied by the current source BDCO divides into two portions I2 and I3 flowing over separate current paths. Thus, the status of contact C2 is returned when no output should be provided.

Figure 4:
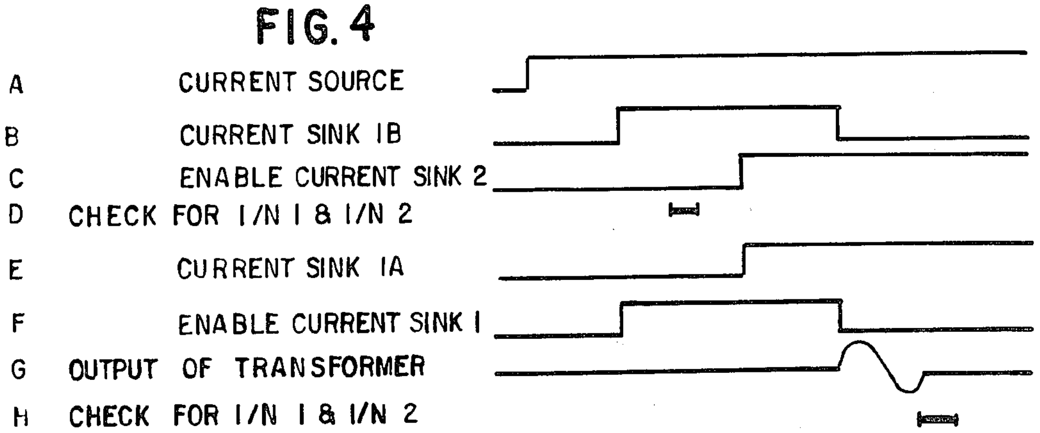
FIG. 4 is a timing diagram showing the relationship of signals for the matrix access circuits during a normal scan operation.

Accordingly, prior to strobing of the sense amplifier outputs into the sense amplifier register 217, two checks are made on the status of the 1 out of N check circuits associated with the current source and sink drivers. Referring to FIG. 4, lines A–D illustrate conditions obtained during proper operation of the matrix access circuits. During a normal scan operation, the current source BDCO is enabled first, FIG. 4, line A, followed by the ground cable driver GSCA, FIG. 4, line B. Then, prior to the enabling of the core ground switch driver GSCO, the outputs of the 1 out of N check circuits are strobed in response to −100N STRB 1SIG provided by the timing circuit 212, FIG. 4, line D. After the 1 out of N check has been made, the core ground switch driver GDCO is enabled and the cable ground switch driver GSCA is disabled and a second check is made of the outputs of the 1 out of N circuits.

From FIG. 4, lines B–D, it is apparent that during the first strobe of the outputs of the 1 out of N check circuits, none of the core ground switch drivers GSCO should be enabled, and likewise, during the second strobe of the outputs of the 1 out of N circuits, none of the cable drivers GSCA should be enabled. Accordingly, to eliminate the indication of a 1 out of N check fault under the normal operating conditions set forth above, the enabling signal GSCA ENA is connected as an input to the 1 out of N check circuits for the core ground switches GSCO as shown in FIG. 3. Also, the enabled signal GSCO ENA is connected as an input to the 1 out of N cable ground switch drivers GSCA. Accordingly, during normal operation, if at the time the first strobe of the 1 out of N check circuits is made only one cable ground switch GSCA is enabled and the signal GSCO ENA is not provided, no error indication is provided. If, on the other hand, current sink GSCA is permanently off or if the signal GSCO ENA is being provided as shown at line F of FIG. 4, then a 1 out of N error indication is provided.

Moreover, for the condition where cable ground driver GSCA is permanently "on," an error indication is provided during the second strobe of the 1 out of N circuits inasmuch as there are two enabled inputs to the 1 out of N checking circuits for the cable ground switch driver GSCA, one input from the permanently "on" ground driver GSCA and input GSCO ENA.

In a similar manner, permanently "off" condition for core ground switch GSCO causes a 1 out of N error to be generated during the second strobe and a permanently on core ground switch GSCO causes a 1 out of N error to be indicated during the first strobe. The outputs of the 1 out of N check circuits, labelled 100N BDCO, 100N BDCA, 100N GSCA, and 100N GSCO, are extended to the error detection status registor 221 to set corresponding latch circuits of the register 221 in the event of a fault indication.

After the scan data has been stored in the sense amplifier register 217, a signal PA1 LOAD DEV is sent to the buffer TDB, indicating that the data is ready. At such time, a signal SA ENA, provided by timing circuit 212 enables the sense amplifier gate 231 to permit the contents of the sense amplifier register 217 to be gated to the data out multiplex gate circuit 219 and thence to the central processing unit CPU.

As indicated above, the ticketing scanner unit TSU employs duplicated scanners including a pair of scanner peripheral adapters SPA-A, SPA-B and associated scanner current switches RCS-A, RCS-B which operate on a common contact matrix. One of the scanner units, such as scanner unit A is normally configured in an active mode while the other scanner unit B is configured in a standby mode.

Figures 5, 6:
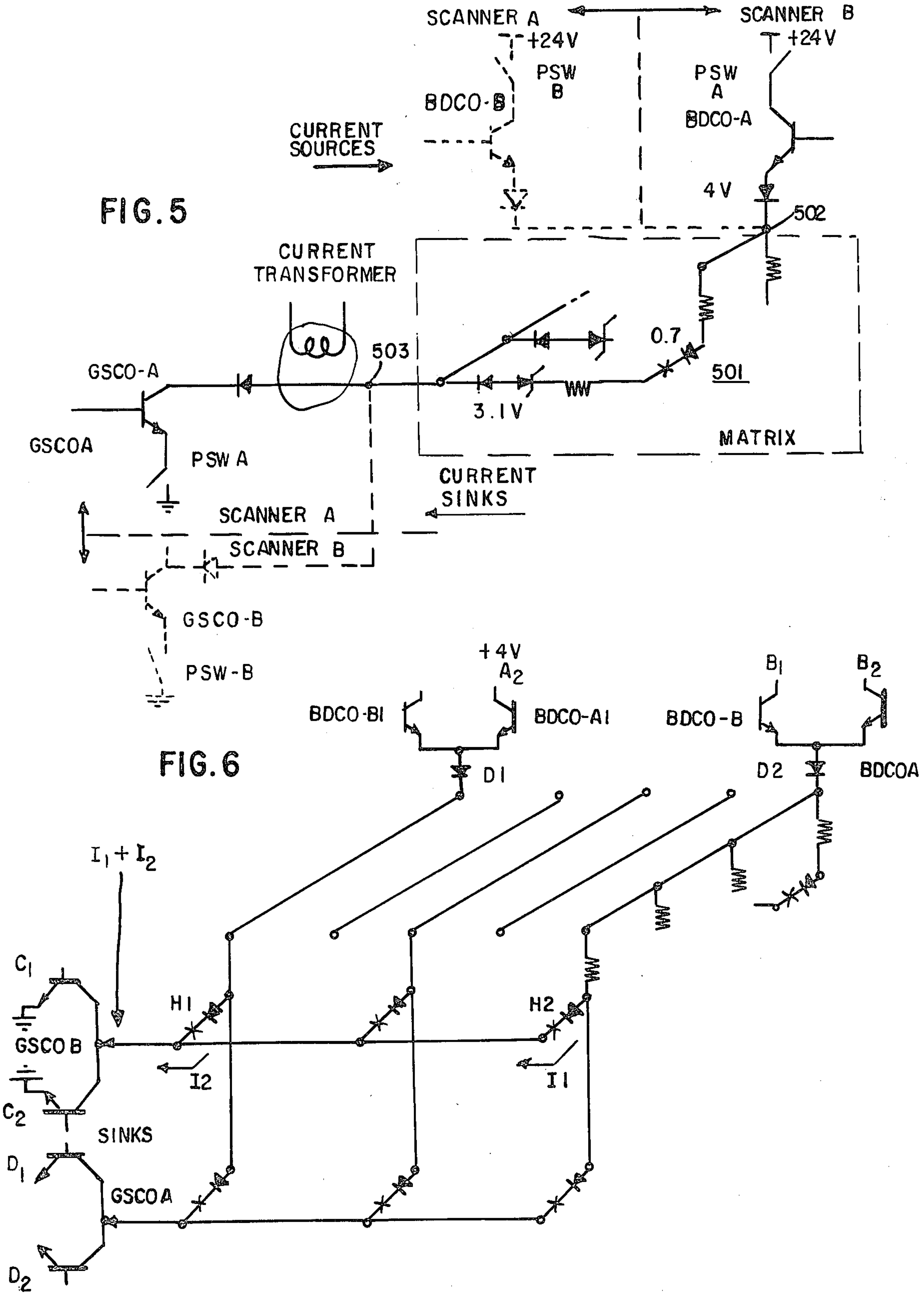
FIGS. 5 and 6 are simplified schematic circuit diagrams showing matrix access circuits for duplicated scanner units.

Referring to FIG. 5, there is shown a simplified schematic circuit diagram of a portion of the matrix access circuitry for the duplicated scanner units A and B, which are associated with a given sense path 501 of the matrix. One of the core current driver circuits BDCO-A of scanner A is connected to the matrix at point 502. Likewise, for the scanner unit B a corresponding current source BDCO B is also connected to point 502.

Similarly, the core ground sink GSCOA for scanner A is conenected to the matrix at point 503 and the corresponding ground switch GSCOB for scanner B is also connected to the matrix at point 503. In accordance with the present invention, power and ground are supplied to the current drivers and ground switches of scanner units A and B over protect switches PSW A PSW B. When scanner A, for example is configured active, its corresponding power switch PSW A is operated connecting battery and ground to the current source and ground sink circuits, respectively. However, the power switch PSW B associated with the other core standby scanner remains disabled to disconnect power and ground from the standby scanner unit. Referring to FIG. 6, if current source B2 fails in the permanently on stage, a current is always available for detecting the state of section 601 of the contact matrix. If the companion scanner is employed, when current source A1 is turned on, or any other current source other than B1, two current paths exist through the matrix. Accordingly, the status of both contacts H1 and H2 is combined resulting in an erroneous output.

However, in accordance with the present invention, the power switch associated with the standby scanner unit is disabled when the unit assumes the standby configuration to prevent erroneous current path from being established through the matrix.

The operation of the switches PSW A PSW B associated with the duplicated scanner units A and B is effected under common control operation in response to directives for commands provided by the unit CPU as will be described in detail hereinafter.

Operation of the Ticketing Scanner Unit

Figure 10:
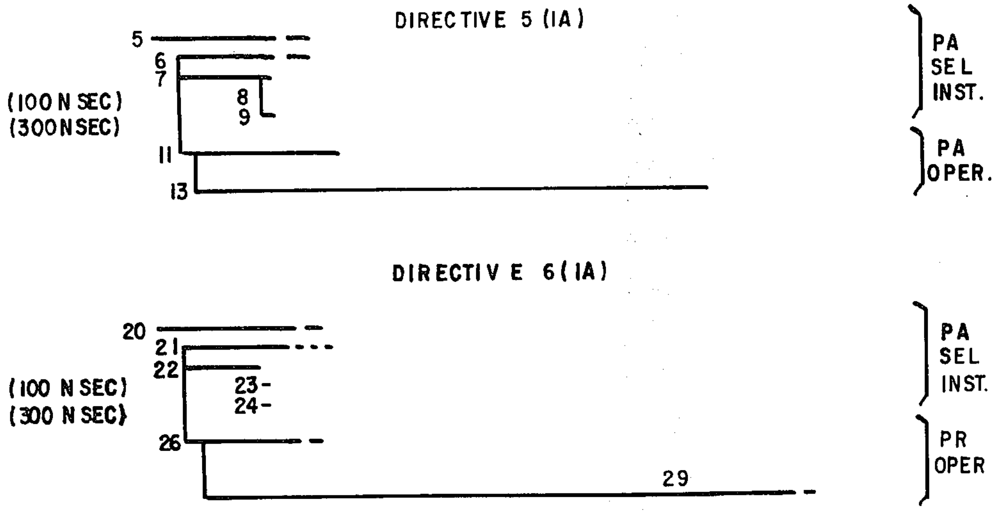
Figure 11:
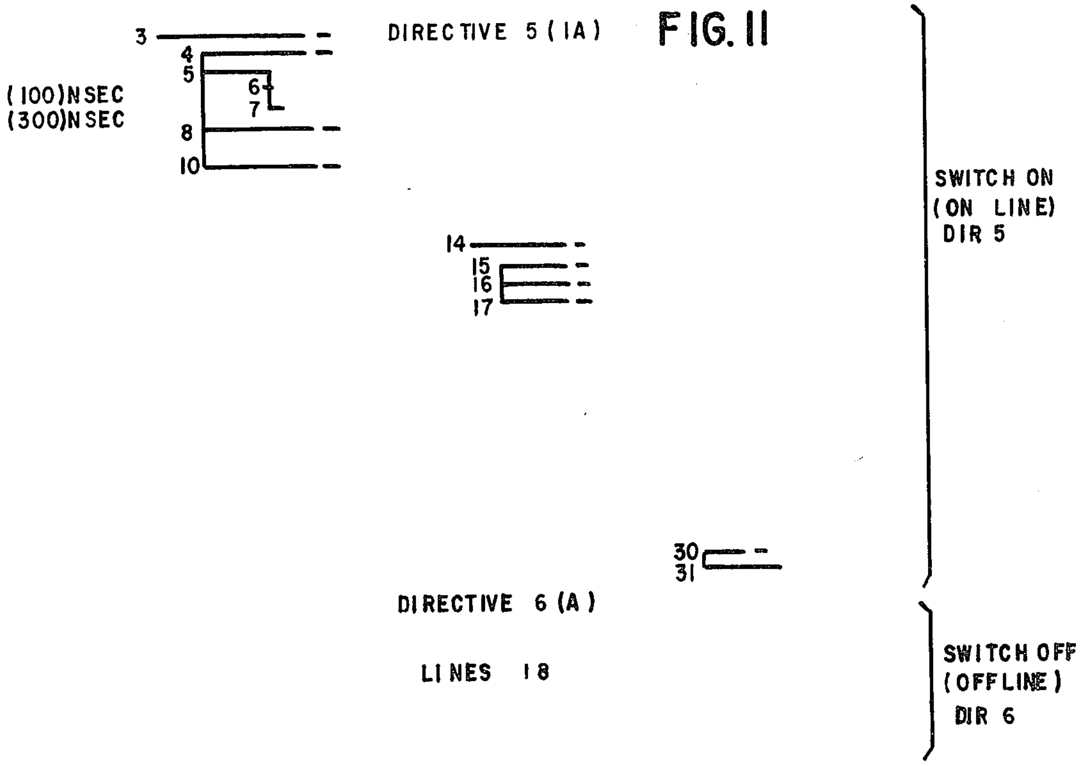
Figure 7:
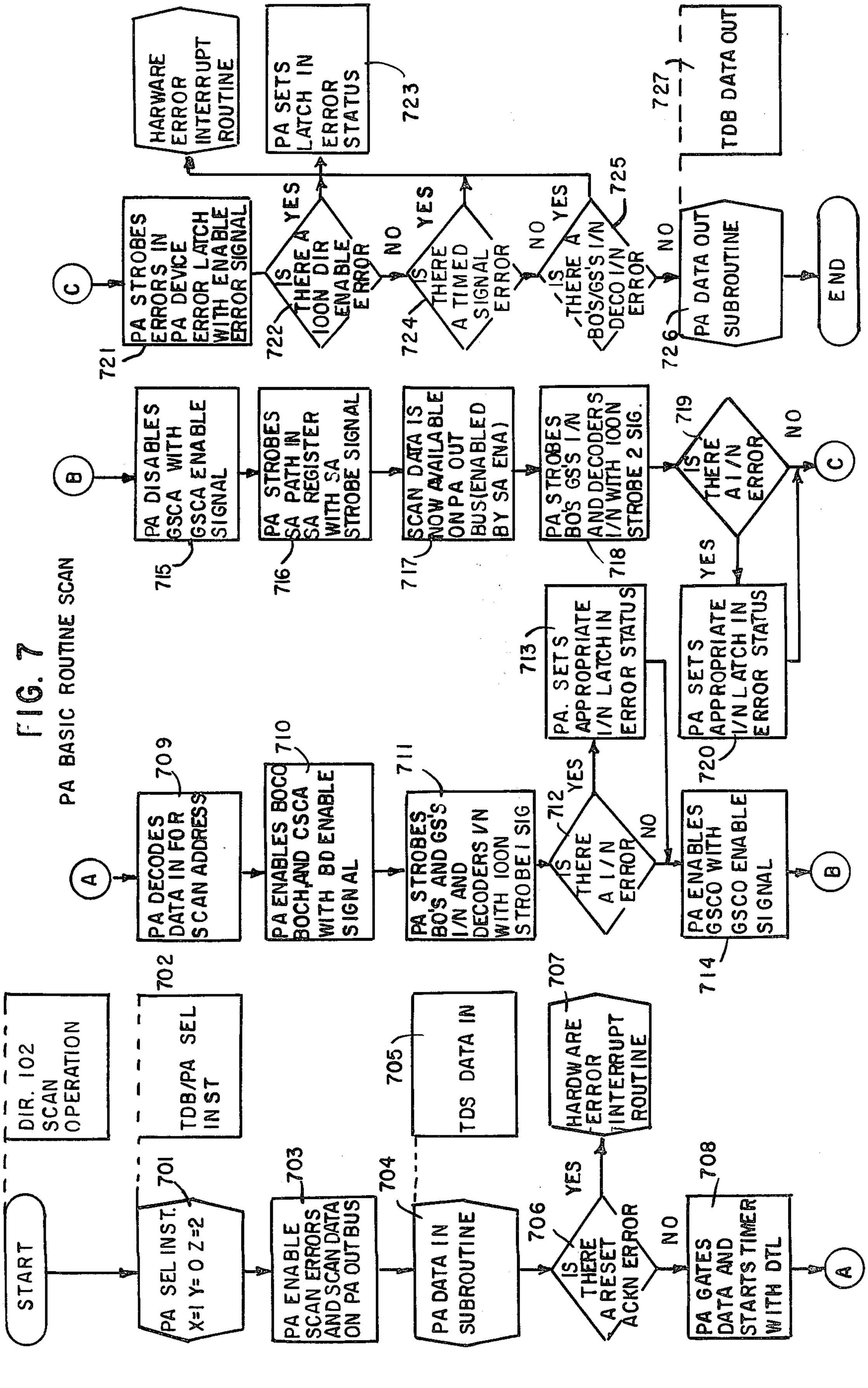
FIGS. 7–8 are hardware flowcharts illustrating the operation of circuits of the ticketing scanner unit; and, FIGS. 9–11 are timing diagrams illustrating the relationship of control and timing signals of the ticketing scanner unit.
Figure 8:
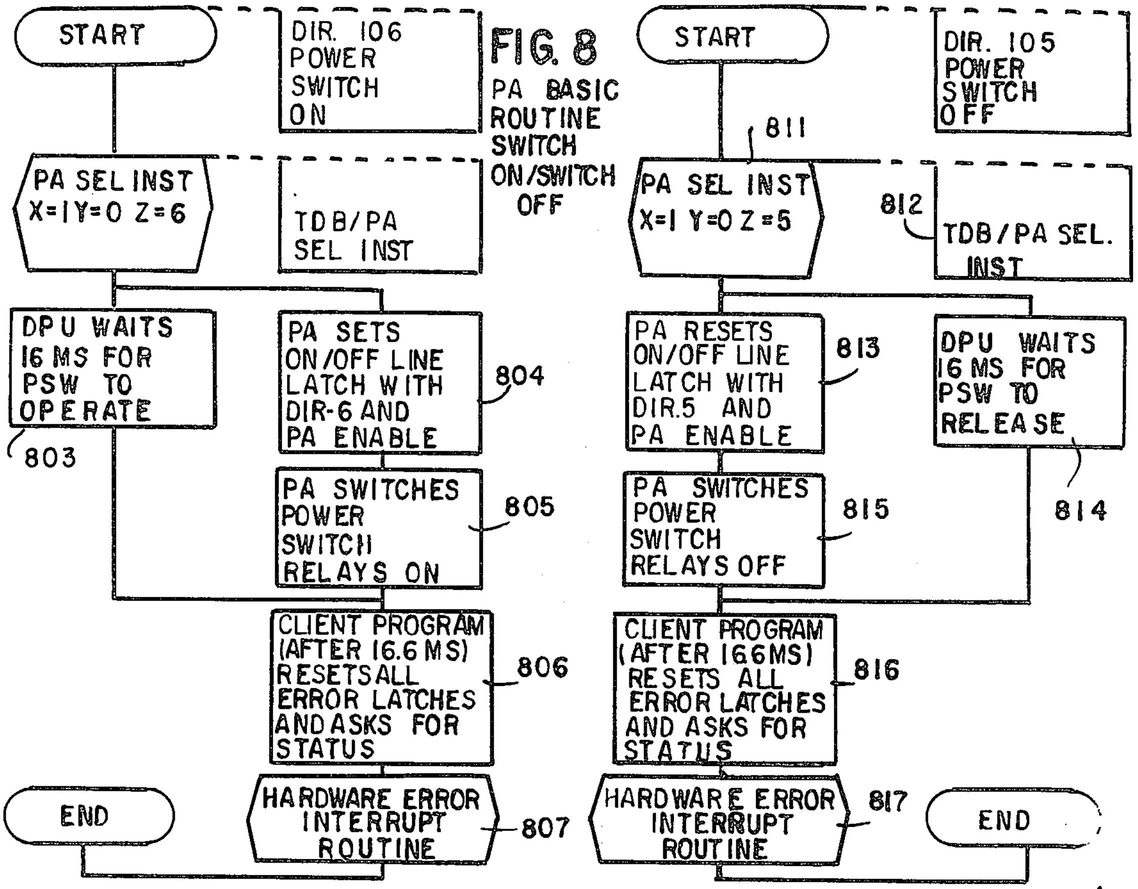
Figure 9:
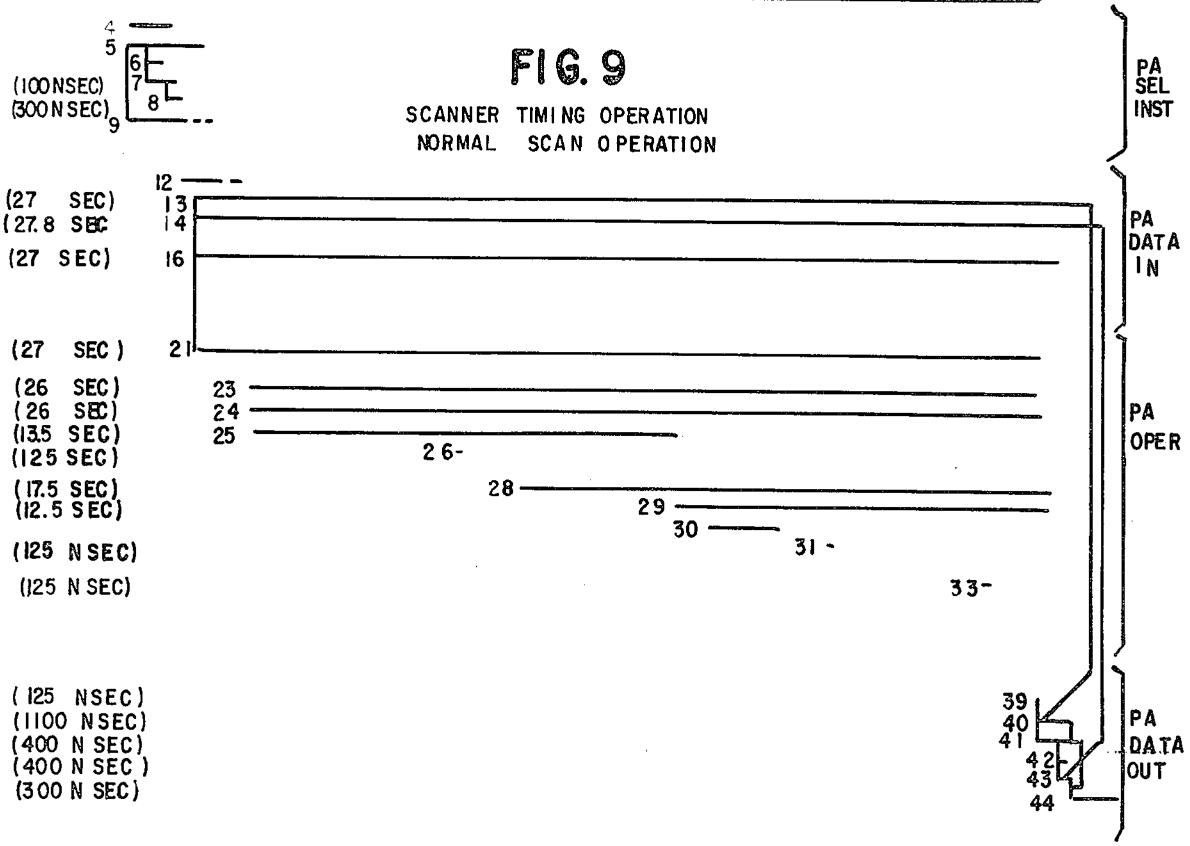

The hardware flowcharts shown in FIGS. 7–8, and the timing diagrams given in FIGS. 9–11 relate to the communication between the device buffer TDB and the scanner adapters SPA-A, SPA-B, and describe the sequence of events necessary for the transmission of data and commands during switch on-switch off and normal scan operations. To aid in the understanding of the operation of the scanner TSU, the following is a brief description of commands and data formats employed by the scanner unit TSU. It is pointed out that particular gates and latch circuits referred to in the following description are more fully disclosed in the SCANNER application referenced above.

SPA Directives and Controls

The scanner unit TSU responds to the following Directives and Controls from the circuit TDB.

(a) Directives

| X Y Z | Fields of SEL INST |
|---|---|
| . . . | |
| . . . | |
| . . . | |
| 1 0 0 | DIRECTIVE 0 (1A), ERR STAT ENA enables the error status of unit TSU (except buffer TDB) on the TDB input lines. No timing required. |
| 1 0 1 | DIRECTIVE 1 (1A), DATA IN ENA in conjunction with PA DTL (1A) and the SPA timing, enables Data to be received from the buffer TDB and returned to the buffer TDB. |
| 1 0 2 | DIRECTIVE 2 (1A), SA ENA in conjunction with signal PA DTL (1A) and timing signals provided by the SPA timing circuits 212, 213 SPA causes Data to be received from the buffer TDB and a Scan to occur on Network Contacts or pseudo-closed contacts in the unit TSU. The scan data is then fed back to the buffer TDB. |
| 1 0 3 | DIRECTIVE 3 (1A), DIR 1 of N CHK in conjunction with signal PA DTL (1A) and the timing signals of scanner SPA effective only at the last pulse introduces an error in the DIR 100N CHK circuitry 222, forcing a DEVICE ERR output to be provided by the scanner SPA. |
| 1 0 5 | DIRECTIVE 5 (1A), SPA OFF LINE causes the +24v and the EG to be switched off from driver circuits BDCO, BDCA and GSCA, GSCO, to render these circuits unaddressable. |
| 1 0 6 | DIRECTIVE 6 (1A), SPA ON LINE causes the +24v and the EG to be switched on for the driver circuits BDCO, BDCA and GSCA, GSCO to render these circuits addressable. |
| 1 0 7 | DIRECTIVE 7, in conjunction with signal PA DTL (1A) and timing of the scanner SPA effective only at the last pulses introduces an error in DIR 100N CHK circuit 222. This results in a DEVICE ERR (only in the scanner adapter SPA). |

(b) Controls

PA 1 EN gates DIRECTIVES, 0, 5 and 6 and signal PA DTL (1A) into the error and status registor 221. PA 1 EN is registered, causing PA 1 ACKN to be sent back to the buffer TDB and signal PA ENA REG to be used internally in the SPA control circuits to gate DIRECTIVES 1, 2 and 3.

PA DTL (1A), when ANDed with PA 1 EN and —ERR STAT BT11, ON LINE, -DEV ERR, causes data to be gated from the buffer TDB and into the SPA DATA IN REG 216. Also it causes the timing circuits 212, 213 of the scanner SPA to begin by gating a clock in the counter 212. To insure that the scanner SPA has been cleared at the end of every operation this ANDed signal clocks a divide by two flip flop such that if RST ACKN (1A) is not received a PA 1 DEVICE ERR is sent to the buffer TDB.

RST ACKN (1A) is sent to the scanner SPA upon receipt of PA 1 ACKN after a PA 1 EN signal provided by the buffer TDB. The signal RST ACKN (1A) is also received from the buffer TDB after the scanner SPA sends it a signal PA 1 SET READY. In both cases the signal RST ACKN (1A) is converted into RST ACK STRET which ORed with PA CLEAR (1A), is used to clear the circuitry of the scanner SPA at the end of operation and resets the PA 1 EN latch circuit.

PA CLEAR (1A), received from the buffer TBD and ORed with signal RST ACK STRET clears the circuitry of the scanner adapter SPA after operation.

PA 1 ACKN signal is sent to the buffer TDB whenever the scanner SPA receives signals PA 1 EN or PA DTL (1A).

PA 1 LOAD DEV is sent to the buffer TDB to indicate that data is available at the scanner SPA Data Out Multiplex 219, to cause that data to be entered into the buffer TDB data register 217 and a SENSE READY signal to be sent to the unit CPU. This is the "last but one" timing signal of the scanner SPA.

PA 1 SET READY signal is sent to the buffer TDB and indicates the end of operation causing the buffer TDB to set its READY FF and return the signal of RST ACKN (1A) to the scanner SPA. It is the last timing signal of the scanner SPA.

PA 1 DEVICE ERR signal is staticised in the scanner SPA and sent to the buffer TDB whenever an error occurs in the operation of the unit TSU except buffer TDB.

It is eventually transmitted to the unit CPU by the buffer TDB as a signal ERR INT.

The Data In routine comprises eight bits which are used to enable matrix access circuits and fifteen bits used for maintenance purposes.

Scan Address

| 23 | 15 | 14 | 13 | 12 11 | 10 9 8 | 7 6 5 4 | 3 2 1 0 |
|---|---|---|---|---|---|---|---|
| | a. | b. | c. | BDCO MAIN | GS MAIN | BDCO ADD FIELD BDCO- 0 15 | GS ADD FIELD GS - 0 15 |

a. INHIBIT RS ACKN
b. GENERATE TIMING ERROR
c. NOT USED

Bits 0 to 3 are decoded by the GS DECO 215 to operate on GSCO groups BDCA, GSCA, GSCO such that:

| BIT 3 2 1 0 |
|---|
| 0 0 0 0 = GSCO 00 group |
| 0 0 0 1 = GSCO 01 group |
| . |
| . |
| 1 1 1 1 = GSCO 15 group |

Only these groups are used for scanning purposes.

In conjunction with Bit 8, this field is extended for maintenance purposes only and serves:

| BIT 8 3 2 1 0 |
|---|
| 1 0 0 0 0 GSCO 16 groups |
| 1 0 0 0 1 GSCO 17 groups |
| . |
| . |
| . |
| 1 0 0 1 1 GSCO 19 groups |

Bit 9 is used, for maintenance only, to simulate no selection for driver circuits GS DECO, GSCA, GSCO, and GDCA (1/N)

Bit 9 · GS00 = GS DECO ERROR
Bit 9 · GS01 = GSCA ERROR
Bit 9 · GS02 = GSCO ERROR
Bit 9 · GS03 = BDCA ERROR

Bit 10 is used, for maintenance only, to simulate, at the inputs of 1 of N check circuits 220, a double selection of circuits GSCO 19 and whichever is selected by the normal GS field (bits 0 to 3 and 8).

Bits 4 to 7 are decoded by the driver circuits BDCO DECO to operate on the circuits BDCO such that:

| BIT 7 6 5 4 |
|---|
| 0 0 0 0 BDCO 00 for maintenance only |
| 0 0 0 1 BDCO 01 |
| 0 0 1 0 BDCO 02 |
| . |
| 1 1 1 1 BDCO 15 |

BDCO 01, BDCO 15 are used for scanning purposes.

Bit 11 is used, for maintenance only, to simulate a circuit BDCO, circuit DECO and circuit BDCO "no selection error."

Bit 11 · BDCO 01 = BD DECO ERR
Bit 11 · BDCO 02 = BDCO ERR

Bit 12 is used, for maintenance only, to simulate at the inputs of 1 of N check circuits 220, a double selection of input 19 of 1/N and whichever circuit BDCO is selected by the normal field of circuit BDCO (Bits 4 to 7).

Bit 14 is used, for maintenance only, to generate a timing error.

Bit 15 is used, for maintenance only, to inhibit RST ACKN STRET, thus preventing reset of the status word at the end of the scan cycle.

Data Out is obtained from:

Data In

Used for maintenance, is exactly as the Data In received.

Scan Data Out

Obtained from the sense amplifier register 217 with:

Bit 0 = Leg 0 or Core 0
Bit 1 = Leg 1 or Core 1
Bit 23 = Leg 23 or Core 23

SPA error status register 221

BIT 4 SA STRB REG
indicates SA STRB is always high.

BIT 5 BD ENA
indicates signal BD ENA is always high.

BIT 6 1 of N GSCO · 1 of N STRB 2
is true at 1 of N STRB if:
1. there is no GSCO selection
2. there is more than 1 GSCO switched on BIT 7 1 of N GSCO · 1 of N STRB 1

At 1 of N STRB 1 the circuit GSCO is switched off. To prevent an unnecessary error indication, GSCA ENA is presented as a separate input to the 1 of N Check Circuit GSCO 220.

Therefore, bit 0 is true only if there is already a circuit GSCO switched on permanently when the GSCA is turned on.

BIT 8 1 of N GSCA · 1 of N STRB 2

At 1 of N STRB 2, the GSCA is turned off. To prevent an unnecessary error indication, GSCO ENA is presented as a separate input to the 1 of N Check Circuit GSCA.

Therefore, bit 3 is true only if there is already a circuit GSCA permanently switched on when the circuit GSCO is turned on.

BIT 9 1 of N GSCA · 1 of N STRB 1 is true at 1 of N STRB 1 if:
1. there is no selection of circuit GSCA
2. there is more than 1 switched on circuit GSCA BIT 10 1 of N BDCA · (1 of N STRB 1 + 1 of N STRB 2)

Since the driver circuit BDCA is selected (turned off) at the very beginning of the scan operation and remains so during the whole cycle, bit 10 is true at 1 of N STRB 1 1 of N STRB 2 if:
1. there is no selection of a driver circuit BDCA
2. there is more than 1 switched off circuit BDCA BIT 11 1 of N BDCO · (1 of N STRB 1 + 1 of N STRB 2)

Since the driver circuit BDCO is selected (turned on)

at the very beginning of the scan operation and remains so during the whole cycle, bit 11 is true at 1 of N STRB 1 1 of N STRB 2 if:

1. there is no selection of a driver circuit BDCO
2. there is more than one switched on circuit BDCO BIT 12 1 of N GS DECO shows a continuous indication of the status of the decoder circuit GS.

This bit is true if:

1. there is no selection of circuit GS
2. there is more than one selected circuit GS BIT 13 1 of N BDCO DECO shows a continuous indication of the status of the decoder circuit BDCO.

This bit is true if:

1. there is no selection of a driver circuit BDCO
2. more than one driver circuit BDCO is selected BIT 14 TIMING ERR is true if at ERR ENA SIG one of the timing signals required for the correct scan operation is missing.

This is applicable for Scan Directive SEL 102.

With Data In Directive SEL 101, SA ENA is false and inhibits all the timing signals used for scanning. Therefore, to prevent an unnecessary error indication signal SA ENA also inhibits the timing error from propagating.

BIT 15 ERR ENA SIG is true whenever ERR ENA SIG is detected in the circuitry of unit TSU i.e., at the end of operation for SEL 101 and SEL 102 and SEL 103.

BIT 16 DIR 5, OFF LINE is true when the OFF LINE Directive SEL 105 is received.

BIT 17 PSW ERR, OFF LINE is true if any of the relay Power Switches PSW is in the on position.

This bit indicates that the unit TSU is not correctly OFF LINE.

BIT 18 DIR 6, ON LINE is true when the ON LINE Directive SEL 106 is received.

NOTE:

BITS 16 and 18 are never true at the same time. In such a case the state of the unit TSU is undetermined and the DC Power on one of the ATT Duplex Pair should be turned off before attempting to exercise the other.

BIT 19 PSW ERR, ON LINE is true if any of the relay Power Switches PSW is in the off position.

This bit indicates that the unit TSU is not correctly ON LINE.

BIT 20 RST ACK ERR is true if for any reason the unit TSU receives two signals DTL from the circuit TDB without being reset in between.

BIT 21 1 of N DIR ENA ERR - ERR STAT ENA is true if during any operation of unit TSU other than ERR STAT ENA Directive SEL 100 we have more than one set directive.

BIT 22 1 of N DIR ENA ERR . ERR STAT ENA is true if when Directive ERR STAT ENA SEL 100 there is more than one set directive.

BIT 23 ERR STAT ENA is true whenever Directive ERR STAT ENA SEL 100 is received.

| | | |
|---|---|---|
| -ERR STAT BT | 18 | = BD ENA |
| | 19 | = 100N STRB 1 REG. |
| | 20 | = GSCO ENA |
| | 21 | = GSCA ENA REG. |
| | 22 | = SA STRB REG. |
| | 23 | = 100N STRB 2 REG. |

Switch On and Switch Off Operations

In the system, a program receives a request for the reconfiguration of the unit TSU from sources such as:

1. Maintenance Personnel,. via the teletypewriter TTY
2. Maintenance Programs
3. Error Interrupt Handlers
4. Timed Routine Scheduler This program analyzes the request for validity i.e., can the request be met without upsetting the working mode of the system and from the System Status Table decides which unit to switch ON and which to switch OFF.

These Switch ON/Switch OFF routines are therefore controlled by the Software and the Hardwiare operations for these routines are as follows:

Switch ON DIRECTIVE 5 (1A) true, and DIRECTIVE 6 (1A) false.

Referring to FIGS. 2, 2A, 8, 10 and 11, this routine consists of a single sequence, started by a SEL INST with X = 1, Y = 0 and Z = 6 block 801, FIG. 8, and line 3, FIG. 11. The buffer TDB decodes these fields into only DIRECTIVE 6 (1A) true and passes it on, with PA 1 EN FIG. 11, line 4, to the status register 221 of scanner adapter SPA. The output of the staticizer 221 PA 1 EN is PA 1 ACKN and is sent back to the buffer TDB FIG. 11, line 5, which responds with RST ACKN (1A), FIG. 11, line 6. The timing circuit 213 of the adapter SPA stretches RST ACKN (1A) to RST ACK STRET and uses RST ACK STRET + CLEAR to reset all its circuitry, FIG. 11, line 7. On receipt of DIRECTIVE 6 (1A) and PA 1 EN two operations result in the scanner adapter SPA:

1. It staticizes DIRECTIVE 6 (1A). PA 1 EN and the output —ERR STAT BT11, ON LINE, of this ON/OFF latch switches the circuits of PSW ON, FIG. 8, blocks 804–805 and FIG. 11, line 8. Feedback signals are obtained from the power switch circuits 225 FIG. 2A (PSW1 to PSW4) which are gated into latches —ERR STAT BT6, PSW ERR ON LINE, and —ERR STAT BT7, PSW ERR OFF LINE of status register 221, to indicate that the circuits 225 PSW are all ON or all OFF respectively. The —ERR STAT BT19 is an input to the latch PA1 DEVICE ERR of the register 221 and sets the latch (FIG. 11, line 10) if any of the circuits of PSW are OFF. The other output of the ON/OFF latch —ERR STAT BT16 is used with —ERR STAT BT19 to enable latch PA DTL (1A) of the status register 221 to start the counter/timer 212 SPA thus insuring that the circuit SPA does not operate unless all the circuits of PSW are correctly switched ON and the circuit SPA is ON LINE.

2. But because the circuits of PSW are relay operated, they are slow in operation and the error detection circuit recognizes, via —ERR STAT BT6, that one or more switches of PSW are still OFF. The Error Detection circuit therefore generates a DEVICE ERR signal. This signal is not sent to the buffer TDB. The software at block 803, FIG. 8:

1. times a delay of 16.6 ms. (FIG. 11, line 12) to allow for the operation of the circuit PSW 225 and then interrogates the Error Status of the scanner SPA to insure that a correct reconfiguration of the subsystem has been accomplished, FIG. 8, blocks 90, 806–7.

This is indicated by:

–ERR STAT BT19, PSW ERR ON LINE — false
–ERR STAT BT17, PSW ERR OFF LINE — true
–ERR STAT BT16, OFF LINE — false
–ERR STAT BT18, ON LINE — true 2. Clear the channel.

Switch OFF DIRECTIVE 5 (1A) — true and DIRECTIVE 6 (1A) — false.

Referring to FIGS. 2, 2A, 8 and 11, this routine consists of a single sequence which is started by a SEL INST with X = 1, Y = 0 and Z = 5 block 811, FIG. 8, line 35, FIG. 11. The buffer TDB decodes these fields into only DIRECTIVE 5 (1A) true and passes it on with PA 1 EN to the circuit SPA, FIG. 11, line 4.

The output of the PA1 EN staticizer 221 is PA 1 ACKN and is sent back to the status register 221 of the buffer TDB which responds with RST ACKN (1A). The timing circuit 213 of scanner SPA stretches RST ACKN (1A) to RST ACK STRET and uses RST ACK STRET + CLEAR to reset all its circuitry. FIG. 11, lines 5–7.

Again because of the time delay in the operation of the PSW circuits 225, these might remain ON for a certain time and therefore –ERR STAT BT19 does not show a PSW ERR, ON LINE, and may not trigger the DEVICE ERR latch of the status register 221. This signal is not sent to the buffer TDB.

The Software at block 213, FIG. 8, therefore has to time a period of 16.6 ms. (FIG. 11, line 12) before;

1. reading SPA's ERR STAT to insure correct switch OFF of that unit
2. addressing the duplicate equipment. Correct switch OFF is indicated by;
   –ERR STAT BT19, PSW ERR ON LINE — true
   –ERR STAT BT17, PSW ERR OFF LINE — false
   –ERR STAT BT16, OFF LINE true
   –ERR STAT BT18, ON LINE false In the switch OFF status the unit TSU does not operate and only responds to a switch ON instruction, DIRECTIVE 5 (1A) is false and DIRECTIVE 6 (1A) is true.

Normal Scan Operation DIRECTIVE 2 (1A) true

For the purpose of this, and subsequent descriptions, it is assumed that the unit TSU circuit SPA is switched ON correctly i.e., all the switches PSW are ON and –ERR STAT BT19, PSW ERR ON LINE — true
–ERR STAT BT17, PSW ERR OFF LINE — false Referring to FIGS. 2, 2A, 7 and 9, the scan routine can be initialized in the unit TSU by the ticketing application program, for monitoring the network circuits through their repeating relays and for maintenance routining and repair verification program to check the operation of the unit TSU, and in particular, the self checking facilities, such as the check circuits 1 of N.

This routine consists of four sequences:

1. PA SEL INST. (FIGS. 7, blocks 701, 702, FIG. 9, lines 11–14).

The routine is started by a SEL INST with X = 1, Y = 0, and X = 2. The buffer TDB decodes these fields into only DIRECTIVE 2 (1A) true and passes it on, with PA1 EN, to the status register 221 of the scanner adapter SPA. The signal PA 1 EN is latched into PA1 ACKN which is sent to the buffer TDB which responds with RST ACKN (1A), FIG. 9, line 7.

After stretching RST ACKN (1A) to a 1.1 ms. pulse, the adapter SPA uses RST ACK STRET + CLEAR to reset all its circuitry (FIG. 9, line 8). The adapter SPA also latches PA 1 ACKN into PA ENA REG of status register 221. This latch is reset whenever PA 1 EN — false such as before a SEL INST. The level PA ENA REG is used to gate DIRECTIVE 2 (1A) into the status register 221. The output (FIG. 9, line 9) of a gate SA ENA true, is fed to the 1 of N Directive Enable Check circuit 222 to insure that only that directive has been selected. If there is a fault, the output of the 1 of N Directive Enable Check circuit 522 is gated by ENA ERR SIG just prior to the end of the operation of the scanner SPA when the output of the gate, 100N DIR ENA GATED, sets PA 1 DEVICE ERR latch and sets –ERR STAT BT21 of the SPA Error Status latch. With SA ENA true, the data in the SA Register 217 is gated to Data Output Multiplex 219.

2. PA DATA IN (FIG. 7, blocks 704, 705)

A Scan Address, as explained above, is sent by the unit CPU onto the buffer of buffer TDB (FIG. 9, line 12). The buffer TDB in its turn sends the data to the scanner SPA with PA DTL (1A) FIG. 9, line 13. The Acknowledge latch of the status register 221 is set again by PA DTL (1A) and the scanner adapter sends PA 1 ACKN (FIG. 9, line 14) to the buffer TDB (the buffer TDB does not respond). The level PA DTL (1A) is also gated with –ERR STAT BT16, OFF LINE –DEV ERR, and
–ERR STAT BT19, PSW ERR ON LINE, to give ON LINE . DTL . PA ENA . –DEV ERR and its inverse.

This resultant signal is used to;

1. gate the data onto the SPA Data In Register 216 (FIG. 9, line 16)
2. start the operation of the SPA clocktimer 212, 213).
3. set a divide by two flip flop such that if the scanner SPA receives two successive PA DTL (1A) signals without a RST ACKN (1A) in between, the PA 1 DEVICE ERR latch (FIG. 7, blocks 706, 707, FIG. 9, line 14) is set by –ERR STAT BT20, –RST ACK ERR to stop further operation of the scanner adapter SPA.

3. PA OPERATION

When SA ENA is true, the required scan signals from the SPA clocktimer 212, 213 are allowed through (FIG. 9, line 21); errors relevant to the Scan Operation of the unit TSU trigger the PA 1 DEVICE ERR latch at ERR ENA SIG; and the Scan Data Out, SA 00 to SA 23, are gated into the SPA Data Out Multiplex 219.

With ON LINE . DTL . PA ENA true, the Scan Address is set into the SPA Data IN Register 216. The Decode circuits, BDCO DECO and GS DECO translate the address fields (FIG. 9, line 16) and select only one of each group of drivers BDCO, BDCA, GSCA AND GSCO (FIG. 7, blocks 709–10). If there is any selection errors (no selection or multiple selections) the 1 of N Check circuits for BDCO DECO and/or GS DECO indicate an error (FIG. 7, blocks 711–713) and set their respective error latches, –ERR STAT BT13 and/or –ERR STAT BT12.

It is to be noted that although the decoders have selected the switches equivalent to the Scan Address, these remain in their quiescent state until their respective Enable Signals appear.

The first clock-timer signal to appear, –BD ENA SIG (FIG. 9, line 23) sets a BD ENA latch. When –BD ENA is false, the BDCO and BDCA driver circuits selected by the decoders switch ON and switch OFF, respectively. The signal −BD ENA SIG also sets the GSCA ENA latch such that when BDCA ENA is true, the selected GSCA circuit switches ON. After 8 microsec, for the switches to settle, the outputs of the 1 of N Check circuits for BDCO, BDCA, GSCA and GSCO are gated by 100N STRB 1 SIG to set respective latches in the SPA error status register 221.

Next, when GSCO ENA SIG is true, the selected GSCO circuit switches ON (FIG. 7, blocks 714, FIG. 9, line 28). Then, when −GSCA ENA SIG is false, the signal resets the GSCA latch and when GSCA ENA is false, the selected GSCA circuit switches OFF. (FIG. 7, block 715, FIG. 9, line 29).

For those lines where the contacts of the repeating relay are closed, switching OFF the GSCA circuit causes the current to be diverted from the BDCO/6-SCA path to the BDCO/GSCO path and thus through the cores. This sharp flow of current is transformed by the cores and the sense amplifiers SA into a pulse of about 3 microsec duration. After 1 microsec from the time GSCA ENA becomes false, a pulse of 1 microsec, −SA STRB SIG false, gates the Scan data (sense amplifier outputs) into the SA Register 217 (FIG. 9, line 30).

A second check on the correct selection of BDCO, BDCA, GSCA and GSCO driver circuits is made when 100N STRB 2 SIG true gates the outputs of the 1 of N Check circuits into their respective latches (FIG. 7, blocks 718–720, FIG. 9, line 31). The last signal in the scanner SPA operation is ERR ENA SIG (FIG. 9, line 33) which allows any OR'ed errors due to 1 of N check circuits or the OR'ed errors due to a malfunction of the lcock-timer 212, 213 to set the PA 1 DEVICE ERR latch (FIG. 7, blocks 721–725).

PA DATA OUT

If there is no circuitry faults, the clock-timer 212, 213 continues and the scanner adapter SPA sends PA 1 LOAD DEV (FIG. 9, line 40) to the buffer TDB which enables the SPA Data Out to be gated to the buffer TDB.

Also the adapter SPA sends PA 1 SET READY (FIG. 9, line 41), the buffer TDB responding with RST ACKN (1A) (FIG. 9, line 42). The adapter SPA uses this signal to generate RST ACK STRET (FIG. 9, line 43) and resets all its circuitry with RST ACK STRET + CLEAR.

On receipt of PA 1 LOAD DEV the buffer TDB sends a SENSE READY signal (FIG. 9, line 44) to the unit CPU indicating that there is data in its buffer. The unit CPU then initiates a CCI instruction to retrieve that data.

I claim:

1. In a communication switching system including a switching network and common control means for establishing paths through the switching network, said network including status means for indicating a busy condition for a given path through the network, means responsive to calls for service from calling lines to obtain the addresses of said lines, and memory means for storing addresses of lines requesting service, a ticketing arrangement comprising: a matrix having a plurality of monitoring devices arranged in a matrix array between rows and columns of said matrix, and ticketing scanner means including first and second scanner units for commonly effecting access of said matrix, each of said scanner units including matrix access means having a first group of driver means connected to the rows of said matrix and a second group of driver means connected to the columns of said matrix, said driver means of said first and second groups being operable when energized to be enabled in pairs to interrogate the status of at least a given one of said monitoring devices, switch means operable when enabled to energize said driver means, and control means for generating a plurality of control signals for each of said scanner units, the control means of one of said scanner units being responsive to a command provided by said common control means to disable the corresponding switch means to effect deenergization of the corresponding driver means, the control means of the other one of said scanner units being responsive to a command provided by said common control means to enable the corresponding switch means to effect energization of the corresponding driver means to permit selective enabling of driver means of the corresponding first and second groups in response to data supplied by said common control means, and each said scanner unit including error detection means for providing an error indication at least whenever unselected driver means are enabled.

2. In a communication switching system including a switching network and common control means for establishing paths through the switching network, said network including status means for indicating a busy condition for a given path through the network, means responsive to calls for service from calling lines to obtain the addresses of said lines, and memory means for storing addresses of links requesting service, a ticketing arrangement comprising: a matrix having a plurality of monitoring devices arranged in a matrix array between rows and columns of the matrix, a scanner unit including matrix access means having a first group of driver means connected to rows of the matrix and a second group of driver means connected to columns of the matrix, switch means operable when enabled to energize said driver means of said first and second groups, and control means operable to generate control signals including a first control signal for enabling said switch means and a plurality of futher control signals for enabling said driver means of said first and second groups, predetermined ones of said driver means being operable when enabled to be responsive to address data supplied by said common control means to effect interrogation of at least one of said monitoring devices.

3. A ticketing arrangement as set forth in claim 2 wherein said control means is responsive to a command provided by said common control means to generate said first control signal.

4. A ticketing arrangement as set forth in claim 3 wherein said control means is responsive to a further command provided by said common control means to provide said further control signals.

5. A ticketing arrangement as set forth in claim 3 wherein said switch means comprises a plurality of first switching devices interposed between a first potential source and said driver means of said first group and a plurality of second switching devices interposed between a second potential source and the driver means of said second group.

6. A ticketing arrangement as set forth in claim 5 wherein said first and second switching devices comprise a relay having normally a pair of contacts connected between one of said potential sources and one of said driver means.

7. In a communication switching system including a switching network and common control means for establishing paths through the switching network, said network including status means for indicating a busy condition for a given path through the network, means responsive to calls for service from calling lines to obtain the addresses of said lines, and memory means for storing addresses of lines requesting service, a ticketing arrangement comprising: a matrix having a plurality of monitoring devices arranged in a matrix array between rows and columns of the matrix, a scanner unit including matrix access means having row access means including first and second groups of driver means connected to rows of the matrix and column access means having third and fourth groups of driver means connected to columns of the matrix, control means responsive to a command and data provided by said common control means to enable a driver means of said first and second groups and a driver means of said third and fourth groups to effect interrogation of at least a preselected one of said monitoring devices, and error detecting means including first, second, third and fourth error detection circuits, each individually associated with a different one of said groups of driver means, for providing an error indication at least whenever more than one driver means of a given group is enabled concurrently.

8. A ticketing arrangement as set forth in claim 7 wherein said control means is operable to enable driver means of said first, second, third and fourth groups in a predetermined sequence, and said control means provides first and second signals for determining the status of said error detection circuits at first and second times.

9. A ticketing arrangement as set forth in claim 8 wherein said control means is operable to provide a first enabling signal for one of said groups of driver means and a second enabling signal for a further group of said driver means, said first enabling signal being extended to the error detection circuit associated with said first group of driver means and said second enabling signal being extended to the error detection circuit associated with said one group of driver means.

* * * * *

UNITED STATES PATENT OFFICE

CERTIFICATE OF CORRECTION

PATENT NO. : 3,898,386

DATED : August 5, 1975

INVENTOR(S) : DAVID E. GAON

It is certified that error appears in the above-identified patent and that said Letters Patent are hereby corrected as shown below:

Column 22, line 31, "links" should be -- lines --

Column 24, line 18, "first" should be -- further --

Signed and Sealed this

*twenty-first* Day of *October 1975*

[SEAL]

*Attest:*

RUTH C. MASON
*Attesting Officer*

C. MARSHALL DANN
*Commissioner of Patents and Trademarks*